(12) United States Patent
Axelsson

(10) Patent No.: US 9,715,165 B2
(45) Date of Patent: Jul. 25, 2017

(54) PROTECTIVE DOME FOR MONITORING CAMERA SYSTEM

(71) Applicant: AXIS AB, Lund (SE)

(72) Inventor: Fredrik Axelsson, Löddeköpinge (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 15/216,806

(22) Filed: Jul. 22, 2016

(65) Prior Publication Data

US 2017/0139309 A1 May 18, 2017

(30) Foreign Application Priority Data

Nov. 16, 2015 (EP) .................................... 15194656

(51) Int. Cl.
*G03B 17/00* (2006.01)
*G03B 17/56* (2006.01)
*G03B 17/02* (2006.01)

(52) U.S. Cl.
CPC ........... *G03B 17/561* (2013.01); *G03B 17/02* (2013.01)

(58) Field of Classification Search
USPC .................................................. 396/427, 448
See application file for complete search history.

(56) References Cited

U.S. PATENT DOCUMENTS

| 5,905,923 A | 5/1999 | Chitsaz et al. |
| 7,346,196 B2 * | 3/2008 | Gin .................... G06K 9/00221 348/151 |
| 2003/0142973 A1 * | 7/2003 | Sawada .................. F16M 11/10 396/427 |
| 2013/0100292 A1 | 4/2013 | Mojaver |

FOREIGN PATENT DOCUMENTS

| EP | 2887328 A1 | 6/2015 |
| WO | 2008003413 A1 | 1/2008 |
| WO | 2008017857 A1 | 2/2008 |

* cited by examiner

*Primary Examiner* — Minh Phan
(74) *Attorney, Agent, or Firm* — Volpe and Koenig, P.C.

(57) ABSTRACT

A dome (102) for a monitoring camera system comprises several monitoring cameras. The dome is formed from a transparent material, and has a toroidal shape with a rotational symmetry along a rotational angle (α) around a first axis of symmetry (S1). An outer segment of the dome, in section, has a shape further defined by a second axis of symmetry (S2) arranged at a first radius (R) from the first axis of symmetry (S1) and is orthogonal to the first axis. The outer segment has a curvature following a second radius (r) over an angle (β) around the second axis of symmetry (S2).

13 Claims, 3 Drawing Sheets

PROTECTIVE DOME FOR MONITORING CAMERA SYSTEM

CROSS REFERENCE TO RELATED APPLICATION

This application claims the benefit of European Patent Application No. 15194656.3 filed on Nov. 16, 2015, which is incorporated by reference as if fully set forth.

FIELD OF INVENTION

The present invention relates to a protective dome for a monitoring camera system, and to a camera system comprising such dome.

BACKGROUND

A typical monitoring camera system comprises a camera head arranged on a base. The base may be provided with a fastening arrangement so as to allow for fastening to a socket or a structure. The camera head may be movable by means of motors or manually to allow for a pan and/or tilt motion. A protective dome, commonly having a hemispheric shape, is generally removably and immovably arranged on the base so enable enclosure of the camera head. It protect the camera head from physical impacts, dust, rain, etc. The protective dome is transparent at least for the wavelength interval relevant for the particular monitoring application. As the camera head pans and tilts the protective dome remains static, there are also versions that allow for the protective dome to move with the camera head, at least when performing a panning motion.

Recently there has been an increased interest in arranging several camera heads on a joint base and having a joint protective dome, resulting in increasingly large protective domes. The present invention mainly relates to domes designed for such a purpose, although the findings may be applied in single-camera arrangements as well.

The arrangement of several camera heads on such a joint base opens up for several opportunities for improvements of which the present invention is one.

SUMMARY

In an effort to eliminate or at least alleviate some of the drawbacks of prior art the present disclosure relates to an improved protective dome for a monitoring camera system. The present invention comprises a dome for a monitoring camera system comprising several monitoring cameras, said dome being formed from a transparent material, characterized in that the dome has a toroidal shape with a rotational symmetry along a rotational angle around a first axis of symmetry, wherein an outer segment of the dome, in section, has a shape further defined by a second axis of symmetry arranged at a first radius from the first axis of symmetry and being orthogonal to the first axis, wherein said outer segment has a curvature following a second radius over an angle around the second axis of symmetry.

It should be noted that though "rotational symmetry" is the most appropriate way of describing the shape in words, the dome does not have to extend over a full rotation (360 degrees), hence the use of "along a rotational angle". Moreover, though the second radius preferably is constant, there may be embodiments where the radius varies with the angle around the second axis of symmetry. An effect of the dome design may be that the arrangement of camera heads within the protective area of the dome will be simplified, and that the effects of image distortions will be reduced. The smaller second radius results in that the overall height of the dome will be reduced.

In one embodiment the dome further comprises a central segment connecting the outer segment with the first axis of symmetry. Notably, connection with the first segment is not a literal connection since the first axis of symmetry is a virtual geometrical construction only.

In one embodiment the dome is manufactured from a single material or a single material compound and in another embodiment the dome is manufactured from a combination of materials. In particular the central segment may comprise at least two portions a first portion manufactured from a first material and a second portion manufactured from a second material.

As will be discussed in relation to the detailed description the various portions or segments of the dome may have different purposes, and while manufacturing the dome in one piece of a single material or material compound is a simple and straightforward manufacturing technique, use of several materials may make the various segments serve their purpose better.

In one embodiment the rotational angle is 360° or less than 360°, such as 90° or 180°. In the straightforward embodiment the dome extends over a full revolution, but for embodiments configured for arrangement in a corner or along a wall, 90° and 180°, respectively, may be preferred.

In one or more embodiments the second radius or the set of second radii is smaller than the first radius (R). Said definition should basically be included in the definition of "toroidal shape" already, and the effects have already been discussed.

In one embodiment the outer segment has an arcuate shape having an extension ($\beta$), wherein said extension is smaller than 90°, equal to 90° or exceeding 90°. This definition should basically be covered by the "toroidal shape" as well. In a preferred embodiment the extension exceeds 90° since this enables for a camera head to look straight down (in an embodiment where the dome is arranged in a ceiling). In the other embodiments, where the extension is equal to or smaller than 90°, there may be a blind angle below the dome, and if necessary a further camera head may be arranged centrally in the dome if a downward view is desired.

In one or several embodiments the central segment may be an essentially planar segment arranged with an offset in relation to a plane defined by the circular outer perimeter. The planar segment enables a space centrally in the dome where components may be arranged (connectors, components, cords, etc).

In still other embodiments the central segment may be an undulated segment comprising one or more curvatures. One desired feature of the dome is that it should protect the components arranged below (or inside if you will). If there is an impact on one portion of the dome it is beneficial if the force is distributed over the whole dome without focusing the force to an edge or similar, and in such a context an undulated segment may have an advantage over a planar one. The central segment may also be undulated in a way such that there is formed a central dome, under which a further camera head may be arranged. This could also be the case in embodiments where a planar segment is used, but an undulated segment may result in more room for the required components.

According to a second aspect of the present invention there is provided a monitoring camera system comprising several monitoring cameras and using a dome according to the description herein, wherein the monitoring cameras are arranged on a base and are covered by the dome, and wherein at least one first monitoring camera has a tilt function, and wherein a corresponding camera tilt axis coincides with said second axis of symmetry.

The paramount effect of having coincident axes is that any image distortion caused by the shape of the dome will be equal for all tilt angles.

In one embodiment at least one first camera of the monitoring camera system is movably arranged along the second axis of symmetry, either in a continuous manner or between fixed positions. The ability to move the cameras enables versatile installations. There are numerous ways of enabling movability, ranging from threaded holes, magnets, guides, etc.

In one particular embodiment guide rail may be arranged such that said at least one first camera is slidably arranged along said guide rail. This is a flexible solution facilitating movability and ensuring that the second axis of symmetry coincides with the tilt axis appropriately. The camera or camera head may be secured to the rail by means of an undercut grip and/or magnets or a clamp mechanism.

In one or several embodiments the number of cameras may exceed one, such as two, three, four, or five, wherein the cameras are arranged in the same way as said at least one first monitoring camera. Basically any required amount of cameras may be arranged, as long as there is physical space available. For a 360° view four cameras could be a typical choice, possibly with the addition of a camera arranged below (within) the central segment of the dome, which camera may have a fisheye lens to provide an overview.

In one or more embodiments the base may comprise a central console aligned with the central segment of the dome. The use of a central console has several beneficial effects. The most obvious one may be that the console may contain wiring, connections, components etc., to ensure adequate protection from view and access. Another effect is that the console indirectly will protect the camera heads (the cameras) from being damaged, i.e. the console is a part of a vandal resistant design. If there is an impact on the dome, such that the dome flexes in the direction of the cameras, the cameras could be damaged even if the dome itself does not break. In such a situation, instead of reaching to the cameras, the central segment of the dome will engage the console preventing further motion of the dome in the direction of the cameras. The console is preferably hollow, such that there is room for components, wiring, etc. and it may be arranged on the base by any means of attachment (screws, welds, snap locks, bayonet connection, etc.). In an alternative embodiment the console also comprises a removable lid enabling simple access to any components arranged therein. The size of the console may be governed by two parameters, the first being that it should house the necessary components and the second being that it should be able to cooperate with the central segment to provide vandal protection. Due to the geometry with cameras arranged radially outside of the central segment the console may have a full overlap with the central segment without hampering with a field of view or being in the way physically. However, the console may be aligned with the central segment in another way and still fulfill its purposes, e.g. it may have a diameter being smaller than the diameter of the central segment, a diameter being larger than the diameter of the central segment, it may have a smaller diameter and being arranged offset in relation central segment, it may have an annular shape increasing the space for a camera arranged below (within) the central segment of the dome, etc.

DETAILED DESCRIPTION OF THE PREFERRED EMBODIMENTS

Figure 1:
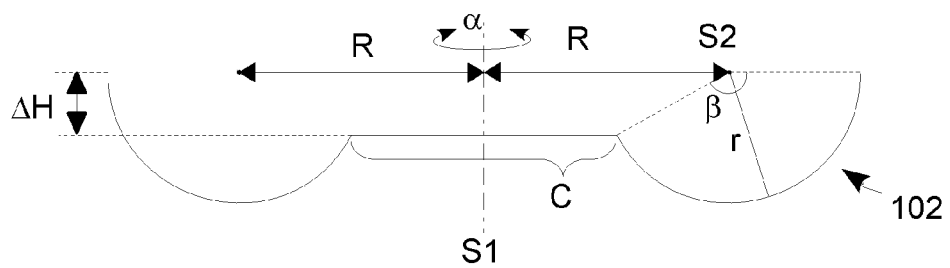
FIG. 1 is a schematic sectional view of a dome according to a first embodiment.

FIG. 1 illustrates a dome 102 according to a first embodiment of the present invention. The view is a schematic cross section and there is rotational symmetry around the axis S1 as indicated in the drawing. The shape of the dome 102, as seen in cross section, is defined by a second axis of symmetry, located at a first radius R from the first axis of symmetry S1 and being orthogonal thereof. The second axis of symmetry is at a distance R from the first axis of symmetry, meaning that the second axis of symmetry for obvious reasons will have the form of a circle when seen in a plan view. Starting from the right and moving towards the first axis of symmetry S1 the shape of the dome as illustrated in FIG. 1 is defined by a first segment represented by an arc following a first radius from the second axis of symmetry over an angle β. The first segment connects to a central segment following an essentially straight line extending the shortest distance to the first axis of symmetry. The portion to the left of the first axis of symmetry S1 is for obvious reasons the mirror image of the portion just described.

Figure 2:
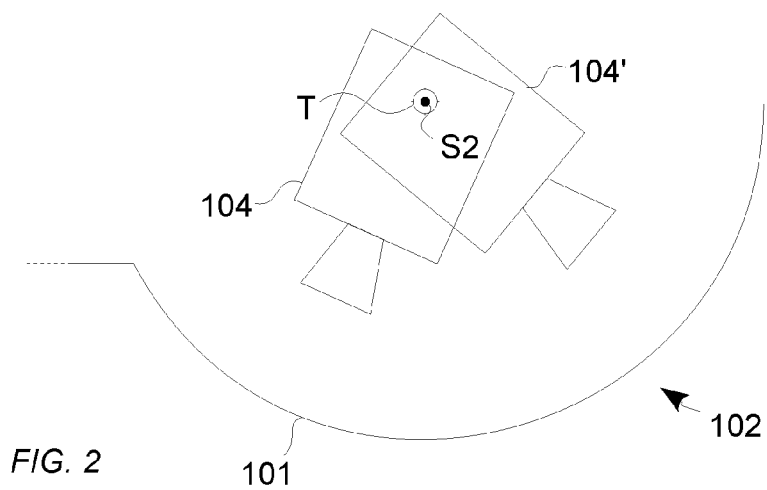
FIG. 2 is a detail view of a dome of the first embodiment with a monitoring camera arranged inside of it.

In FIG. 2 a partial view of a monitoring camera system is shown. Comparison to FIG. 1 clarifies that the view of FIG. 2 represents the right portion of the view of FIG. 1, illustrating the dome 102 and the second axis of symmetry S2. A camera 104 is arranged within the dome 102 and the camera is shown in two positions (illustrated by the reference numerals 104 for the camera in the first position and 104' for the camera in the second position) between which it has been rotated in a tilt direction. The camera 104 has a tilt axis T defining the axis around which it may perform a rotational motion in a tilt direction. The camera 104 is arranged such that the tilt axis T coincides with the second axis of symmetry S2 ensuring that the distance between the camera and the first segment of the dome is constant as the camera 104 is tilted. In FIG. 1 the second axis of symmetry S2 is represented by a point, which is enough for explaining the cross sectional shape of the dome 102. In the more practical embodiment of FIG. 2 there may be a conflict between the curved second axis of symmetry S2 and the rectilinear tilt axis T of the camera in that a curved axis could not actually coincide perfectly with a rectilinear axis, at least not in the literal sense of the word. For that reason the interpretation of "coincide" is not to be interpreted literally. In a practical case the rectilinear tilt axis T is arranged in a tangential direction to the second axis of symmetry S2, and it may e.g. be arranged such that a center point of the axis T coincides with the axis S2. Tolerances may result in that the axes do not coincide in a point, and other considerations may also result in the same thing.

Figure 3:
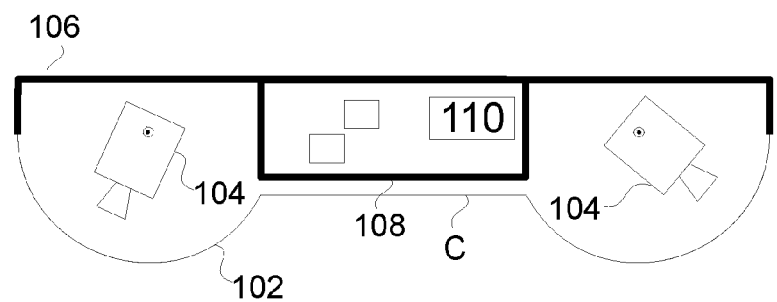
FIG. 3 is a schematic sectional view of a monitoring camera system according to a first embodiment.

FIG. 3 illustrates a monitoring camera system where at least two cameras are arranged. The dome 102 as well as the tiltable cameras are recognized from the previous description and should need no further introduction. It may be emphasized that both cameras are arranged as the camera of FIG. 2. Adding to the previously described components a base 106 has been added. The base 106 acts as a carrier for the dome 102 as well as the cameras 104. Furthermore a central console 108 is arranged in which electronics, processing hardware and communication hardware, all denoted 110 may be arranged. The central console 108 will at least serve the dual purpose of protecting the components therein at the same time as it cancels out internal reflections within the dome and thus reduces glare and similar effects. Such effects may deteriorate the quality of imaging, and they may also trigger false events, e.g. a motion-detection algorithm could mistake a reflection for an actual movement. The central console 108 is aligned with the central segment C of the dome, such that at least a portion of the central console 108 overlaps with at least a portion of the central segment C as seen in a plan view. In the illustrated embodiment the central console 108 is completely overlapped by the central segment C, again as seen in a plan view. The full or partial overlap results in that the central console 108 may serve a third purpose: If there is an impact on the dome 102, e.g. as a result of someone hitting the dome, the dome will flex inwardly towards the cameras and components arranged therein. This could potentially disturb the alignment of one or more of the cameras, or even physically affect other components of the monitoring camera system resulting in malfunction, loss of connection or failure of operation. Instead, with the present setup, the central portion C of the dome 102 will engage with the central console 108 and the impact may be transferred to and absorbed by structural components not negatively affected by it, thus sparing the integrity and functionality of the camera system. Surfaces of the central console that may come into contact with the dome, such that the rim facing the dome, could be covered or lined with a resilient material. Another straight forward use of the console is for hiding wiring and cables, e.g. any surplus cable slack from the cameras may be hidden under the console. In yet another embodiment (not shown) the central segment of the dome, or at least a portion thereof, may be absent, and the central console may comprise an attachment for a post or similar. In this way the camera system may be readily arrange on a post. Such an arrangement may be realized in an embodiment where there is no central console as well, and the attachment does not necessarily have to be arranged on the central console. In a related embodiment (not shown) means for attachment to a post or similar are arranged on the central segment instead, or as a replacement of the central segment. In an embodiment from the same family of embodiments the angle β may extend 180° or at least significantly more than 90°. In versions of such embodiment the dome may extend down to a base along its outer perimeter (as for the illustrated embodiments) and along its inner perimeter. A post may then be attached directly to the base as well. In still another alternative embodiment the base may be annular as well, such that the post may extend through the middle of the base. In another embodiment the monitoring camera system may be configured to be suspended from above, e.g. pending down from a post. In such a configuration the angle β may extend up to 180° (or even more), and the electronics may be arranged within the base.

Figure 4:
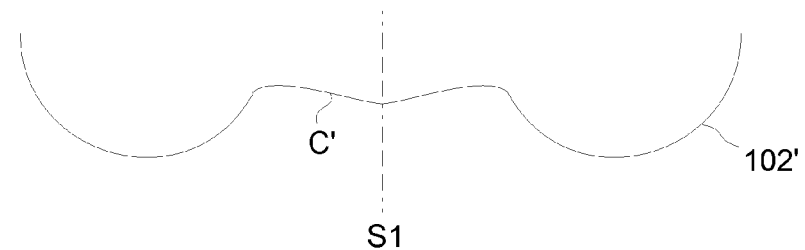
FIG. 4 is a schematic sectional view of a dome according to a second embodiment.

FIG. 4 is a view similar to that of FIG. 1 yet of a dome 102' according to a second embodiment, representing actually a second set of embodiments. In this second set of embodiments the central segment C' has an undulated design. In the illustrated embodiment the dome still has rotational symmetry, yet in other embodiments an area defined by the central segment C' may have undulations or a shape that is non-symmetrical. One reason for providing the central segment with undulation of some sort may be to improve the dome's ability of absorbing an impact. Sharp edges may create areas of concentrated strain during an impact or deformation, thus increasing the risk of breakage.

Figure 5:
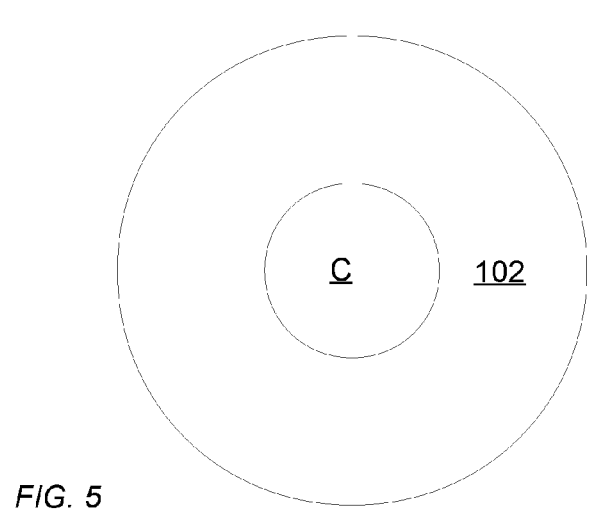
FIG. 5 is a schematic plan view of the dome according to the first embodiment.
Figure 6:
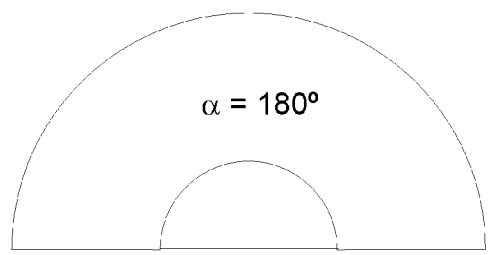
FIG. 6 is a schematic plan view of a dome according to a third embodiment.
Figure 7:
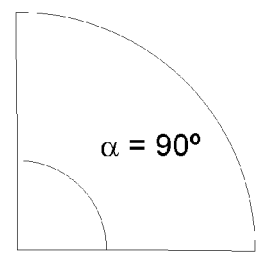
FIG. 7 is a schematic plan view of a dome according to a fourth embodiment.

FIGS. 5-7 illustrate three embodiments where the angle α is altered. In the embodiment of FIG. 5 α equals 360°, representing an embodiment that may be arranged in a ceiling and enabling arrangement of e.g. 4 cameras or more within the dome for a full 360°-view. Fewer than cameras four or more may of course be arranged, such as 3, 2 or 1. In the embodiment of FIG. 6 α equals 180°, representing an embodiment that may be arranged in a ceiling, where the ceiling meets a wall. Two or more cameras may be arranged to cover a suitable field of view, while of course fewer cameras or a higher number of cameras may be arranged as well. An embodiment suitable for arrangement in a corner is illustrated in FIG. 7, where α equals 90°.

In another set of embodiments the angle β may be varied, β defining the angular extension of the first segment starting from the outermost perimeter (e.g. the ceiling against which it is arranged), as exemplified in FIG. 1. In essence variation of the angle β will affect the possibilities of tilting a camera arranged inside the dome. For specific cases the angle β may be significantly smaller than 90°, and it may also be slightly smaller than 90° or equal to 90°. In the embodiments illustrated thus far the angle β is slightly larger than 90°, enabling a tilt angle for the camera that may vary between 0 and 90°, or even above. In effect this means for a camera system arranged in a ceiling the cameras may have a field of view ranging from looking along the ceiling and also looking straight down below the camera system, and even a bit further in the embodiments where the angle α is slightly larger than 90°, thus a suitable arrangement of monitoring cameras under single dome may provide a full coverage of views. In this context it may be mentioned that prior art solutions generally offer more complex and bulky or less versatile alternatives. A typical prior art solution is presented in US20130100292, representing a common compound solution, where the dome is divided into separate functional portions. In terms of functionality the prior art solution may be comparable, depending on the cameras used, but it will be significantly more complex, have a higher number of joints and will have a more noticeable geometrical profile.

Figure 8:
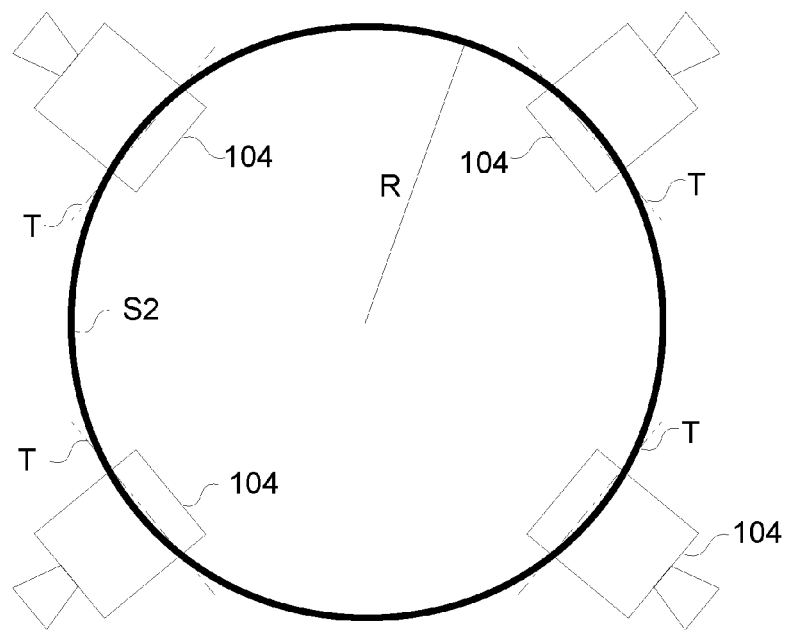
FIG. 8 is a schematic plan view of a monitoring camera arrangement.

FIG. 8 illustrates a schematic plan view of a monitoring camera system comprising features already described, having four monitoring cameras arranged with their respective tilt axis T aligned with the second axis of symmetry S2. The tilt will be affected in the same plane as the angle β, and vice versa, at least in the preferred embodiments. The cameras may be powered from a central power supply arranged in the middle of the arrangement (in the central console 108), and connected to processing arrangements therein for processing of image data. This enables that a simple and straightforward connection by means of physical cables may be used while still providing full versatility. Notwithstanding this beneficial feature obviously more complex solutions, such as wireless systems or a slip ring arrangement, may be used without departing from the inventive concept.

To increase the versatility of the monitoring camera system it may be preferred that the cameras are arranged on a guide rail or similar, enabling continuous or indexed movement between different static camera positions. Such a feature allows for a tailor made coverage of a particular scene, and a use of a guide rail also ensures the alignment between the tilt axis T and the second axis of symmetry S2. There are several options for the guide rail, ranging from a series of threaded openings to an actual rail to which the cameras may be secured by means of magnets, clamps or screw arrangements, and reference is made to EP2887328 to the present applicant relating to a magnetic rail.

The dome itself may be manufactured from polycarbonate or another suitable material, and components such as the base may be manufactured from plastic or metal, or a composite material. The choice of material may be adjusted depending on a particular application, yet for most purposes the choice of material may be limited to materials commonly used within the established field of dome cameras. A typical thickness for the dome may be 1-3 mm, typically about 2 mm. Injection moulding may be a suitable method for manufacturing the dome.

Figure 9:
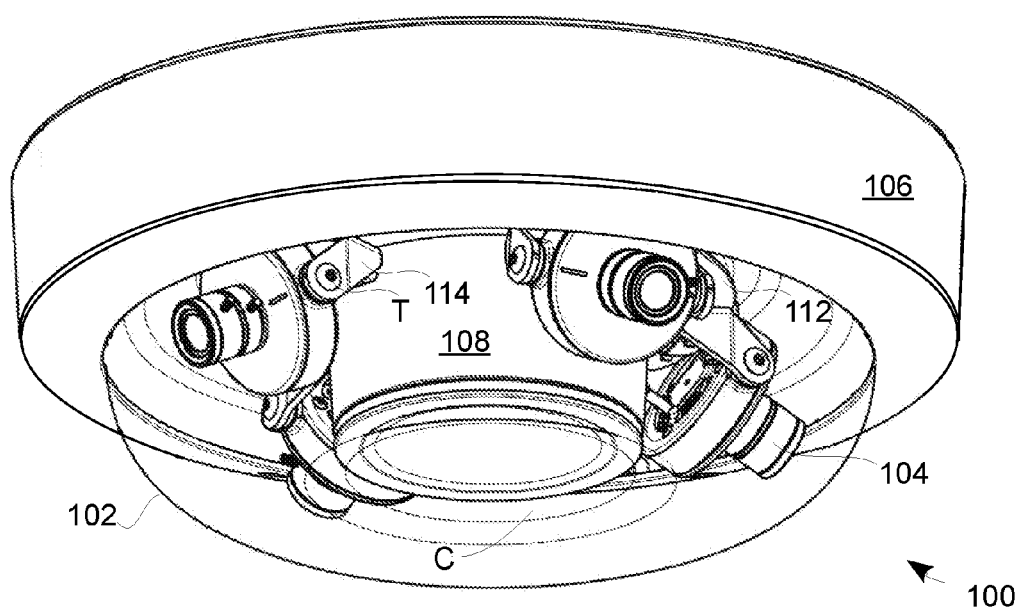
FIG. 9 is a perspective view of a monitoring camera arrangement.

FIG. 9 illustrates a monitoring camera system 100 in a perspective view thereof. The dome 102 is indicated rather than fully illustrated to the benefit of components arranged below it. Several monitoring camera heads 104 are seen arranged on a guide rail 112 via a mount 114. The camera heads are pivotally arranged on the mount, thus providing the tilt axis T. In the view of FIG. 9, the central console has been removed to allow visual access to the components arranged therein. There are obviously several different ways of obtaining the same or similar functionality yet for the purposes of enabling the present invention as disclosed herein the embodiment illustrated in FIG. 9 is a viable alternative. The cameras may have lenses being of fixed focal length, or being varifocal, yet other alternatives are not excluded. For example, a camera arranged below (within) the central segment may have a lens of a wide-angle type, one example being a fisheye lens.

What is claimed is:

1. A dome for a monitoring camera system comprising:
   several monitoring cameras;
   said dome being formed from a transparent material,
   wherein the dome has a toroidal shape with a rotational symmetry along a rotational angle around a first axis of symmetry,
   wherein an outer segment of the dome, in section, has a shape further defined by a second axis of symmetry arranged at a first radius from the first axis of symmetry and being orthogonal to the first axis,
   wherein said outer segment has a curvature following a second radius over an angle around the second axis of symmetry, and
   wherein a central segment connects the outer segment with the first axis of symmetry, the central segment being an essentially planar segment arranged with an offset in relation to a plane defined by the curvature of the outer segment.

2. The dome of claim 1, wherein the dome is manufactured from a single material or a single material compound.

3. The dome of claim 1, wherein the dome is manufactured from a combination of materials, and wherein in particular a central segment comprises at least two portions, a first portion manufactured from a first material and a second portion manufactured from a second material.

4. The dome of claim 1, wherein the rotational angle is 90°, 180°, 360° or less than 360°.

5. The dome of claim 1, wherein the second radius or a set of second radii is smaller than the first radius.

6. The dome of claim 1, wherein the outer segment has an arcuate shape having an extension, wherein said extension is smaller than 90°, equal to 90° or exceeding 90°.

7. The dome of claim 1, wherein the central segment is an undulated segment comprising one or more curvatures.

8. The dome of claim 1, wherein the central segment comprises means for attaching the dome to a post.

9. A monitoring camera system comprising:
   several monitoring cameras and using a dome according to claim 1,
   wherein the monitoring cameras are arranged on a base and are covered by the dome,
   wherein at least one first monitoring camera has a tilt function, and
   wherein a corresponding camera tilt axis coincides with said second axis of symmetry.

10. The monitoring camera system according to claim 9, wherein said at least one first camera is movably arranged along the second axis of symmetry, either in a continuous manner or between fixed positions.

11. The monitoring camera system of claim 9, wherein a guide rail is arranged such that said at least one first camera is slidably arranged along said guide rail.

12. The monitoring camera system of claim 9, wherein the number of cameras exceeds one, and wherein the cameras are arranged in the same way as said at least one first monitoring camera.

13. The monitoring camera system of claim 9, wherein the base comprises a central console aligned with the central segment of the dome.

* * * * *